US010885520B2

(12) United States Patent
Lin et al.

(10) Patent No.: US 10,885,520 B2
(45) Date of Patent: Jan. 5, 2021

(54) SCRIPT DEPLOYMENT THROUGH SERVICE PROVIDER SERVERS

(71) Applicant: Apple Inc., Cupertino, CA (US)

(72) Inventors: Jeff W. Lin, San Jose, CA (US); Christopher Sharp, San Jose, CA (US); Vineet Chadha, Santa Cruz, CA (US); Akila Suresh, San Jose, CA (US); Sinduja Murari, Santa Clara, CA (US); Gordon Y. Scott, Cupertino, CA (US); Ho Cheung Chung, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 501 days.

(21) Appl. No.: 15/713,552

(22) Filed: Sep. 22, 2017

(65) Prior Publication Data
US 2018/0082293 A1 Mar. 22, 2018

Related U.S. Application Data

(60) Provisional application No. 62/398,462, filed on Sep. 22, 2016.

(51) Int. Cl.
*G06Q 20/40* (2012.01)
*G06Q 20/08* (2012.01)
(Continued)

(52) U.S. Cl.
CPC .......... *G06Q 20/40* (2013.01); *G06Q 20/085* (2013.01); *G06Q 20/0855* (2013.01);
(Continued)

(58) Field of Classification Search
CPC ...... G06F 21/57; G06F 21/6209; G06F 21/78; G06F 21/00; G06F 21/44; H04L 2209/60;
(Continued)

(56) References Cited

U.S. PATENT DOCUMENTS 9,483,249 B2 * 11/2016 Khan .................... G06F 8/65
2013/0081113 A1 * 3/2013 Cherian .............. H04W 12/003
726/4

(Continued)

*Primary Examiner* — Scott S Trotter
(74) *Attorney, Agent, or Firm* — Morgan, Lewis & Bockius LLP

(57) ABSTRACT

A device facilitating script deployment through service provider servers includes at least one processor configured to receive, from a service provider, a request to perform a transaction directly with a device secure element on which a credential is provisioned, where the request includes a credential identifier corresponding to the credential. The at least one processor is further configured to identify, based at least in part on the credential identifier, the device secure element. The at least one processor is further configured to verify that the service provider is authorized to interact directly with the device secure element. The at least one processor is further configured to instruct, responsive to the verifying, the device secure element to communicate directly with a service provider server to perform the transaction. The at least one processor is further configured to receive, from the device secure element, a result associated with the transaction.

20 Claims, 8 Drawing Sheets

(51) Int. Cl.
*G06Q 20/32* (2012.01)
*G06Q 20/12* (2012.01)
*G06Q 20/38* (2012.01)

(52) U.S. Cl.
CPC ......... *G06Q 20/12* (2013.01); *G06Q 20/3227* (2013.01); *G06Q 20/38215* (2013.01)

(58) Field of Classification Search
CPC .. H04L 63/0853; G06Q 20/02; G06Q 20/085; G06Q 20/40; G06Q 20/38215; G06Q 20/12; G06Q 20/0855; G06Q 20/3227
See application file for complete search history.

(56) References Cited

U.S. PATENT DOCUMENTS

| | | | |
|---|---|---|---|
| 2013/0145429 A1* | 6/2013 | Mendel | G06F 21/00 726/4 |
| 2015/0052064 A1* | 2/2015 | Karpenko | G06Q 20/3829 705/71 |
| 2015/0161587 A1* | 6/2015 | Khan | G06Q 20/3223 705/44 |

\* cited by examiner

SCRIPT DEPLOYMENT THROUGH SERVICE PROVIDER SERVERS

CROSS-REFERENCE TO RELATED APPLICATIONS

The present application claims the benefit of U.S. Provisional Patent Application Ser. No. 62/398,462, entitled "Script Deployment Through Service Provider Servers," filed on Sep. 22, 2016, which is hereby incorporated by reference in its entirety for all purposes.

TECHNICAL FIELD

The present description relates generally to script deployment onto device secure elements, including script deployment onto device secure elements through service provider servers.

BACKGROUND

In a mobile payment system, a payment applet that is provisioned on a secure element of an electronic device may correspond to a transaction credential ("credential") or card account, such as a credit card account. The payment applet typically is provisioned on the secure element by a system owner. The payment applet may be used by the electronic device, after an authorized user authenticates with the mobile device (e.g., via fingerprint and/or password), to engage in a wireless payment transaction with, e.g., a wireless payment terminal. For example, after an authorized user authenticates with the electronic device, the electronic device may transmit, to the wireless payment terminal, a request for a wireless payment transaction using the card account corresponding to the payment applet.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
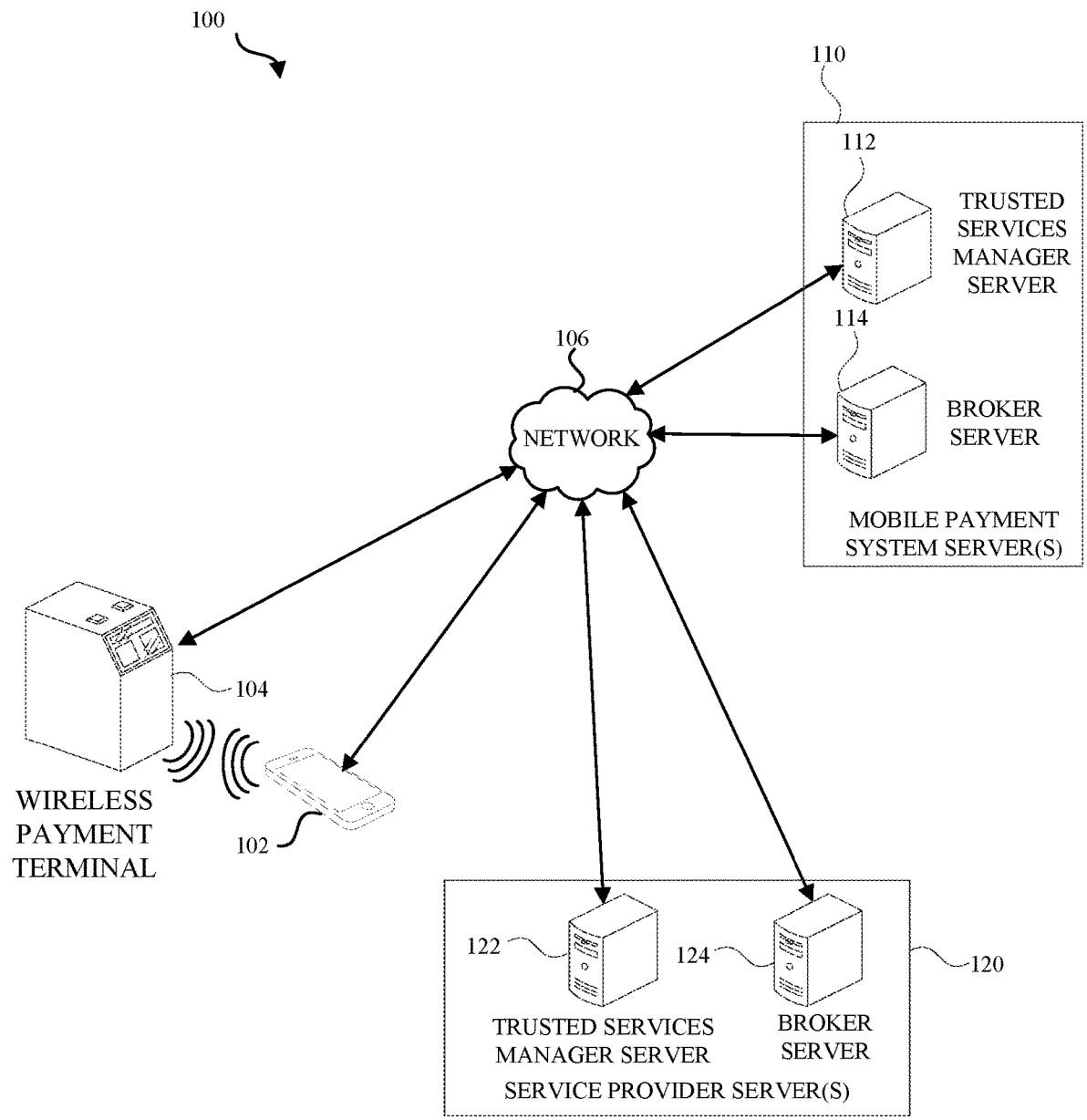
FIG. 1 illustrates an example network environment for script deployment through service provider servers in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In a mobile payment system, in addition to the aforementioned payment applets that correspond to credit card accounts, one or more stored value payment applets that correspond to one or more respective stored value cards (or "truth on card" or "actual cash value" (ACV) cards), such as a transit card or other such prepaid card, may be provisioned on a secure element of an electronic device. A stored value card may differ from, e.g., a credit card, in that monetary value is stored with the card itself, rather than being stored in an external account, e.g., maintained by a financial institution. Since a representation of monetary value is stored directly with the card instance, such as in a secure element on an electronic device, modifications to the stored value card, including balance adjustment services and the like, cannot be performed directly between the mobile payment system server(s) and the service provider server(s). Rather, some types of modification to the stored value card must be performed with respect to the actual stored value payment applet, as stored on the secure element of the electronic device. For example, the modification can be performed between the service provider server(s) (e.g., a trusted services manager (TSM) server) and the secure element on the electronic device with the mobile payment system server(s), which are in direct communication with the secure element, acting as a proxy for the service provider server(s).

However, some of these modifications (or services) may include one or more communications that utilize, e.g., proprietary and/or specific authentication protocols that involve repeated exchanges between the secure element of the electronic device and the service provider server. In other instances, a modification or other such transaction may involve multiple exchanges for other reasons, such as data transfer and validation. In some instances, modifications to non-stored value cards (e.g., credit cards) also may be processed similarly. Thus, it may not be efficient for a transaction to be proxied through the mobile payment system servers that are typically in direct communication with the secure element on the electronic device. Furthermore, different service providers, such as different transit providers, may be located around the world, and it may not be feasible or efficient for the mobile payment system to deploy servers across multiple data centers worldwide, particularly when the service provider servers are already located there.

In the subject system, a mobile payment system server (e.g., a TSM server), acts as a global gateway that allows one or more authorized service provider servers (e.g., service provider TSM servers) to communicate directly with a secure element on an electronic device to perform a given transaction, such as modifying a credential (e.g., a stored value credential). Since a given service provider server may often be located in the same general geographic area as the secure element on the electronic device engaged in the transaction with the service provider server, the subject system may reduce the latency associated with performing the transaction by eliminating the need for a mobile payment system server (which may not be located in the same geographic area as the secure element or the service provider server) to act as a proxy for the communications between the secure element and the service provider server.

FIG. 1 illustrates an example network environment 100 for script deployment through service provider servers in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. Although the description is generally presented with respect to one or more stored value payment credentials (or applets), the techniques disclosed also may be implemented with respect to other types of payment credentials (or applets).

The network environment 100 includes an electronic device 102, a wireless payment terminal 104, a network 106, one or more mobile payment system servers 110, and one or more service provider servers 120. In one or more implementations, the one or more mobile payment system servers 110 may include a TSM server 112 and a broker server 114, and the one or more service provider servers 120 may include a TSM server 122 and a broker server 124.

The network 106 may communicatively (directly or indirectly) couple, for example, any two or more of the electronic device 102, the wireless payment terminal 104, the one or more mobile payment system servers 110 and/or the one or more service provider servers 120. In one or more implementations, the network 106 may be an interconnected network of devices that may include, or may be communicatively coupled to, the Internet. For explanatory purposes, the network environment 100 is illustrated in FIG. 1 as including a single electronic device 102 and a single service provider server 120; however, the network environment 100 may include any number of electronic devices and service provider servers.

The electronic device 102 may be, for example, a portable computing device such as a laptop computer, a smartphone, a peripheral device (e.g., a digital camera, headphones), a tablet device, a wearable device such as a watch, a band, and the like, or any other appropriate device that includes one or more wireless interfaces, such as near field communication (NFC) radios, WLAN radios, Bluetooth radios, Zigbee radios, cellular radios, and/or other wireless radios. In FIG. 1, by way of example, the electronic device 102 is depicted as a mobile device. The electronic device 102 may be, and/or may include all or part of, the electronic device discussed below with respect to FIGS. 2 and 3, and/or the electronic system discussed below with respect to FIG. 8. In one or more implementations, the electronic device 102 may include a secure element onto which payment applets, including stored value payment applets, may be provisioned. An example electronic device that includes a secure element is discussed further below with respect to FIG. 2, and an example secure element is discussed further below with respect to FIG. 3.

The wireless payment terminal 104 may be, for example, a wireless transit payment terminal, a wireless toll payment terminal, a wireless parking meter payment terminal, a wireless point of sale payment terminal, and/or any device that includes one or more wireless interfaces that may be used to perform a wireless payment transaction, such as NFC radios, wireless local area network (WLAN) radios, Bluetooth radios, Zigbee radios, cellular radios, and/or other wireless radios. In FIG. 1, by way of example, the wireless payment terminal 104 is depicted as a wireless transit payment terminal. The wireless payment terminal 104 may be, and/or may include all or part of, the electronic system discussed below with respect to FIG. 8.

The electronic device 102 may communicate with the wireless payment terminal 104 via a direct communication, such as NFC that bypasses the network 106. In one or more implementations, the electronic device 102 may communicate with the wireless payment terminal 104 over the network 106 and/or the wireless payment terminal 104 may not be communicatively coupled to the network 106.

The one or more mobile payment system servers 110 may include one or more servers that facilitate providing a mobile payment system to the electronic device 102. In one or more implementations, the one or more mobile payment system servers 110 may be and/or may include a secure mobile platform. For example, the mobile payment system servers 110 may include one or more TSM servers 112, one or more broker servers 114, one or more application servers, and/or generally any servers that may facilitate providing a mobile payment system.

In one or more implementations, an authorized user of the electronic device 102 may have a user account and/or a network account with the mobile payment system via the one or more mobile payment system servers 110. The user account may be used to manage the various cards and/or credentials that the user has registered with the mobile payment system. The one or more mobile payment system servers 110 may be, and/or may include all or part of, the electronic system discussed below with respect to FIG. 8.

The one or more service provider servers 120 may include one or more servers that facilitate a service being provided, such as a transit service, and/or that may facilitate utilizing wireless payment transactions for the service being provided. In one or more implementations, the one or more service provider servers 120 may include one or more servers corresponding to one or more financial institutions. The one or more service provider servers 120 may include one or more TSM servers 122, one or more broker servers 124, one or more application servers, or generally any servers that may facilitate providing a service and/or utilizing wireless payment transactions for the service.

In one or more implementations, an authorized user of the electronic device 102 may have a user account with one or more service providers associated with the one or more service provider servers 120. The user account may be used to, e.g., utilize a credential associated with the service provider for wireless payment transactions via the electronic device 102. The one or more service provider servers 120 may be, and/or may include all or part of, the electronic system discussed below with respect to FIG. 8. For explanatory purposes, the one or more service provider servers 120 are generally described herein with reference to a single transit system. However, the one or more service provider servers 120 may include one or more servers corresponding to multiple different services. For example, the one or more service provider servers 120 may correspond to servers of multiple different transit systems, communications services, toll services, and/or other such services.

In one or more implementations, the broker servers 114, 124 may communicate with each other, such as for purposes of managing user authentication with the one or more service provider servers 120. One or more of the TSM servers 112,122 may communicate with the secure element of the electronic device 102 via the network 106 to facilitate managing stored value payment applets (and/or other payment applets) provisioned on the secure element of the electronic device 102. For example, one or more of the TSM servers 112,122 may deploy scripts to the secure element of the electronic device 102 for modifying/updating one or more stored value payment applets, and/or for provisioning new stored value payment applets on the secure element of the electronic device 102. In one or more implementations, the provisioning of new stored value payment applets onto the secure element of the electronic device 102 may be performed by the TSM server 112 of the one or more mobile payment system servers 110 on behalf of the one or more service provider servers 120.

The stored value payment applets may be provisioned on the secure element with an applet identifier (AID) and/or one or more attributes, such as an attribute storing the amount of the monetary value associated with the stored value payment applet, and/or services associated with the stored value payment applet, such as a monthly transit pass, a transit pass for a number of rides, and the like. Once a stored value payment applet has been provisioned on the secure element of the electronic device 102 for a given service provider, the electronic device 102 may be used for a wireless transaction (e.g., with that service provider), such as a wireless payment transaction with the wireless payment terminal 104. Thus, when utilizing an NFC-based wireless payment transaction, the user may place their electronic device 102 on, or in close proximity to (e.g., within approximately 4-20 centimeters), the wireless payment terminal 104 to perform a wireless payment transaction with the wireless payment terminal 104.

In order to update, renew, or modify an attribute of an existing stored value payment applet provisioned on the secure element of the electronic device 102, a user of the electronic device 102 may access a web site and/or an application ("app") corresponding to the associated service provider, such as a web site and/or app provided by the one or more service provider servers 120, and/or the user may interact with a physical device corresponding to the associated service provider, such as a stored value card provisioning device, e.g., to request that monetary value and/or one or more services be added to and/or modified on the existing stored value payment applet. The user may provide a monetary payment to the service provider, such as a cash payment to a physical machine and/or an electronic payment via the web site or app. The monetary payment may correspond to the monetary value the user would like added to the stored value payment applet and/or the monetary payment may correspond to the value of the services being added and/or renewed.

The one or more service provider servers 120 cause the monetary value and/or services to be added to the existing stored value payment applet provisioned on the secure element of the electronic device 102 by deploying a script to be executed by the secure element of the electronic device 102. The script may include one or more commands, instructions, and/or code elements to be executed by the secure element and, in one or more implementations, the script may be referred to as a personalization (or "perso") script. Since the TSM server 122 of the one or more service provider servers 120 may not be authorized to communicate directly with the secure element on the electronic device 102, the one or more service provider servers 120 may communicate with the secure element on the electronic device 102 through the one or more mobile payment system servers 110. However, as mentioned above, an operation such as a script deployment transaction may involve multiple back and forth exchanges between the secure element on the electronic device 102 and the one or more service provider servers 120. Therefore, transaction latency may be incurred by proxying the exchanges through the one or more mobile payment system servers 110.

In the subject system for script deployment through the one or more service provider servers 120, when the one or more service provider servers 120 receives a request to provision, add to, and/or otherwise modify a stored value payment applet, or an attribute thereof, provisioned on the secure element of the electronic device 102, instead of proxying the script deployment transaction through the one or more mobile payment system servers 110, the one or more service provider servers 120 transmits a request to the one or more mobile payment system servers 110 to perform the transaction directly with the secure element on the electronic device 102.

If the one or more service provider servers 120 are authorized to perform the script deployment transaction directly with the secure element of the electronic device 102, the one or more mobile payment system servers 110 instruct the secure element on the electronic device 102 to perform the script deployment transaction directly with the one or more service provider servers 120. After the transaction is completed (or incurs a time-out or otherwise fails), the secure element on the electronic device 102 transmits the results of the transaction to the one or more mobile payment system servers 110 and the results are forwarded by the one or more mobile payment system servers 110 to the one or more service provider servers 120. In this manner, the one or more service provider servers 120 can be informed of the results of the transaction, e.g., when the transaction incurs a time-out or otherwise fails.

In one or more implementations, if the transaction resulted in an attribute of the stored value payment applet being modified, e.g., other than changing the stored monetary value attribute, such as renewing a service, adding a service, changing a service, etc., the mobile payment application on the electronic device 102 is instructed to refresh the displayed data to reflect the transaction. An example process flow for script deployment through the one or more service provider servers 120 is discussed further below with respect to FIG. 4. An example process for the one or more mobile payment system servers 110 in the subject system is discussed further below with respect to FIG. 5, an example process for the secure element on the electronic device 102 in the subject system is discussed further below with respect to FIG. 6, and an example process for the one or more service provider servers 120 in the subject system is discussed further below with respect to FIG. 7.

Figure 2:
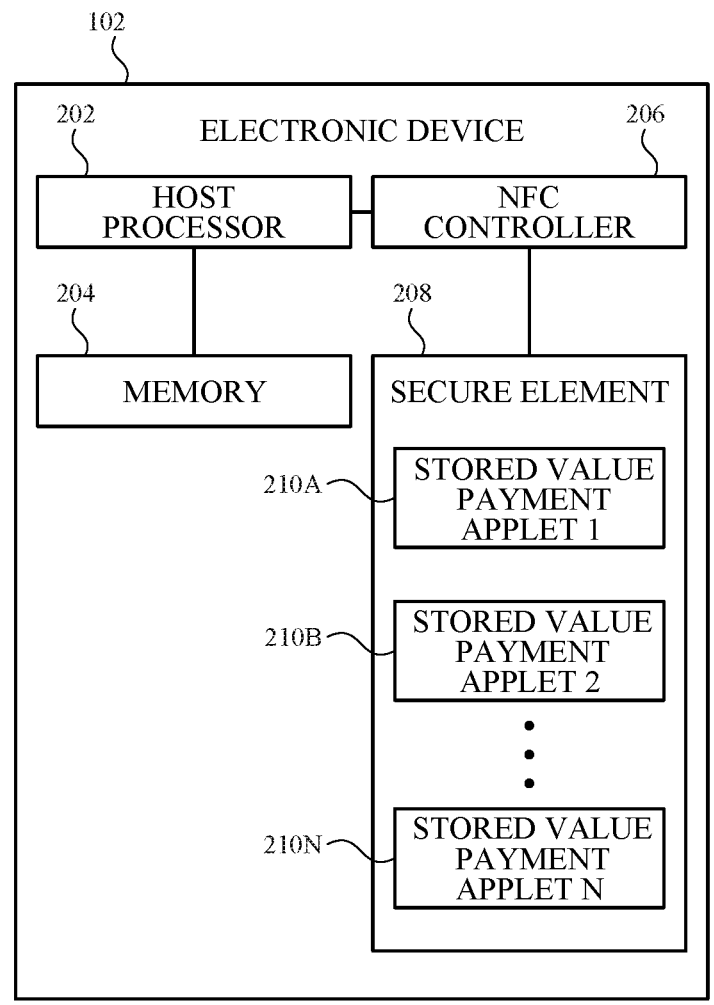
FIG. 2 illustrates an example electronic device in a system for script deployment through service provider servers in accordance with one or more implementations.

FIG. 2 illustrates an example electronic device 102 in a system for script deployment through service provider servers in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, an NFC controller 206, and a secure element 208, which may also be referred to as a device secure element. The secure element 208 may include one or more interfaces for communicatively coupling to the NFC controller 206 and/or the host processor 202, such as via one or more single wire protocol (SWP) connections and/or any other data connection. The secure element 208 may include one or more provisioned stored value payment applets 210A-N and/or one or more provisioned payment applets, e.g., corresponding to one or more credit card accounts. In one or more implementations, the operating system and/or execution environment of the secure element 208 may be a JAVA-based operating system and/or JAVA-based execution environment, and the one or more stored value payment applets 210A-N may be JAVA-based applets. In other implementations, other operating systems, languages, and/or environments can be implemented. In addition to the one or more stored value payment applets 210A-N, the secure element 208 may also include one or more additional applets for performing other operations, such as a security applet, a registry applet, and the like.

The one or more stored value payment applets 210A-N may be provisioned on the secure element 208 in part by, for example, the TSM server 112 and/or the broker server 114. For example, the TSM server 112 and/or the broker server 114 may transmit a provisioning script to the electronic device 102 via the network 106. The host processor 202 of the electronic device 102 may receive the script and may provide the script to the secure element 208, such as via the NFC controller 206 and/or directly to the secure element 208. The secure element 208 may perform one or more security mechanisms to verify the received script, such as one or more security mechanisms inherent in a Global Platform framework, and may then execute the received script.

The execution of the script by the secure element 208 may cause one or more of the stored value payment applets 210A-N to be provisioned on the secure element 208. The one or more stored value payment applets 210A-N may each be provisioned with one or more of: an applet identifier, a device primary account number (DPAN) identifier, an identifier of the associated service provider, and/or one or more attributes. The applet identifier associated with a given stored value payment applet 210A may be used by, for example, the host processor 202, the TSM servers 112,122, and/or the broker servers 114,124, to uniquely identify the stored value payment applet 210A relative to the other stored value payment applets 210B-N provisioned on the secure element 208, such as to perform one or more operations with respect to the given stored value payment applet 210A. In one or more implementations, the applet identifiers may be used by the host processor 202 to store associations between the one or more stored value payment applets 210A-N and the associated one or more service provider servers 120.

The one or more attributes provisioned with the one or more stored value payment applets 210A-N may include, for example, an attribute that indicates the amount of the monetary value that is being locally stored in each applet, an attribute that describes one or more services associated with each applet, and the like. In one or more implementations, the one or more stored value payment applets 210A-N may also be provisioned with an attribute that indicates the type of communication protocol used by the applets to communicate with wireless payment terminal 104. The types of communication protocols may include, for example, an NFC-A protocol, an NFC-B protocol, an NFC-F protocol, a Bluetooth protocol, a Bluetooth low energy protocol, a Zigbee protocol, a Wi-Fi protocol, or generally any communication protocol.

The one or more attributes of the one or more stored value payment applets 210A-N may be modified by the execution of one or more scripts, such as one or more scripts received from one or more of the TSM servers 112,122. For example, the execution of one or more scripts by the secure element 208 may cause a modification in the amount of monetary value indicated by an attribute of a stored value payment applet 210A, may cause an attribute describing a service to be added to a stored value payment applet 210A, and/or may cause a change in a service described by an attribute of a stored value payment applet 210A, such as causing a service renewal, causing a modification to a service, etc.

The one or more stored value payment applets 210A-N may correspond to the same service provider, such as the same transit system, and/or may correspond to different service providers, such as different transit systems. In one or more implementations, one of stored value payment applets 210A-N associated with a given service provider may be designated as a default stored value payment applet for the service provider. The default designation may be characterized by a state attribute associated with the stored value payment applet.

The NFC controller 206 may include one or more antennas and one or more transceivers for transmitting/receiving NFC communications. The NFC controller 206 may further include one or more interfaces, such as a single wire protocol interface, for coupling to the host processor 202 and/or the secure element 208. The NFC controller 206 may be able to communicate via one or more different NFC communication protocols, such as NFC-A (or Type A), NFC-B (or Type B), and/or NFC-F (or Type F or FeliCA). The NFC-A protocol may be based on International Organization for Standardization (ISO)/International Electrotechnical Commission (IEC) 14443A and may use Miller bit coding with a 100 percent amplitude modulation. The NFC-B protocol may be based on ISO/IEC 14443B and may use variations of Manchester encoding along with a 10 percent modulation. The NFC-F protocol may be based on FeliCA JIS X6319-4 and may use a slightly different variation of Manchester coding than the NFC-B protocol.

The wireless payment terminal 104 of FIG. 1 may include similar wireless communication capabilities as the electronic device 102. For example, the wireless payment terminal 104 may include one or more antennas and/or transceivers for communicating with the electronic device 102 via one or more of an NFC-A protocol, an NFC-B protocol, an NFC-F protocol, a Bluetooth protocol, a Bluetooth low energy protocol, a Zigbee protocol, a Wi-Fi protocol, or generally any communication protocol. In one or more implementations, the wireless payment terminal 104 may include a wireless reader, such as an NFC reader.

For explanatory purposes, the electronic device 102 uses the NFC controller 206 to communicate with the wireless payment terminal 104. However, the electronic device 102 may use any wireless communication protocol to communicate with the wireless payment terminal 104, such as Bluetooth, Bluetooth low energy, Wi-Fi, Zigbee, millimeter wave (mmWave), or generally any wireless communication protocol.

The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the host processor 202, the memory 204, the NFC controller 206, the secure element 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
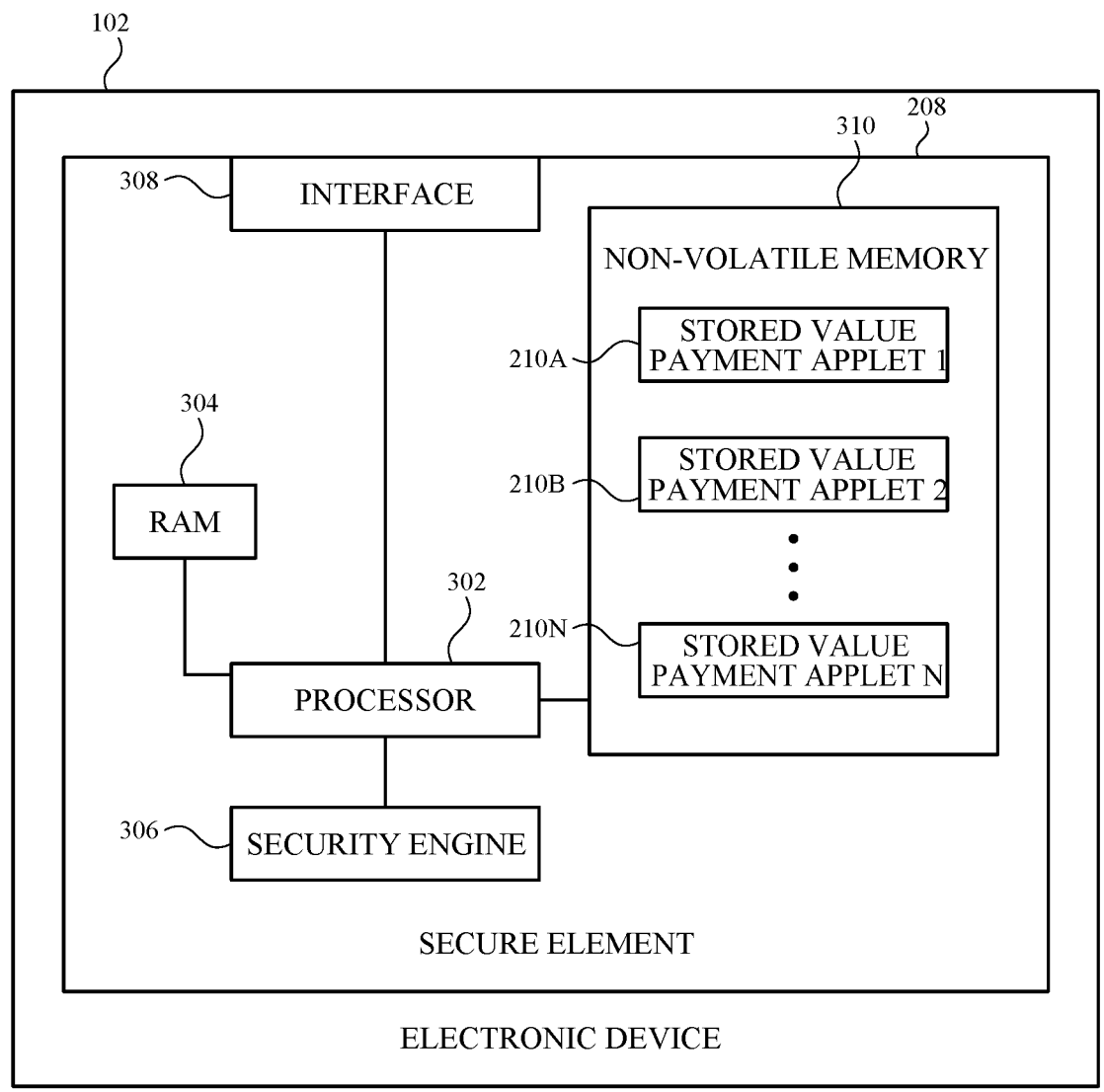
FIG. 3 illustrates an example electronic device including an example secure element that may be used in a system for script deployment through service provider servers in accordance with one or more implementations.

FIG. 3 illustrates an example electronic device 102 including an example secure element 208 that may be used in a system for script deployment through service provider servers in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The secure element 208 of the electronic device 102 includes a secure processor 302, RAM 304, a security engine 306, an interface 308, and non-volatile memory 310. The RAM 304 may include one or more of static RAM (SRAM), and/or dynamic RAM (DRAM). The interface 308 may communicatively couple the secure element 208 to one or more other chips in the electronic device 102, such as the NFC controller 206 and/or the host processor 202. The interface 308 may be, for example, a SWP interface, a universal serial bus (USB) interface, or generally any data interface. The secure processor 302 may be, for example, a reduced instruction set computing (RISC) processor, an advanced RISC machine (ARM) processor, or generally any processing circuitry.

The security engine 306 may perform one or more security operations for the secure element 208. For example, the security engine 306 may perform cryptographic operations and/or may manage cryptographic keys and/or certificates. In one or more implementations, the communications between the secure element 208 and an external device, such as the wireless payment terminal 104 and/or one or more of the TSM servers 112,122 may be encrypted and/or may involve one or more other security mechanisms. For example, for NFC-F communications, an encryption key may be dynamically generated each time mutual authentication is performed. In these one or more implementations, the encryption/decryption and/or key generation/management may be performed all or in part by the security engine 306.

The non-volatile memory 310 may be and/or may include, for example, flash memory. The non-volatile memory 310 may store the attributes and executable code associated with the one or more stored value payment applets 210A-N. In one or more implementations, the non-volatile memory 310 may also store firmware and/or operating system executable code that is executed by the secure processor 302 to provide the execution environment for the one or more stored value payment applets 210A-N, such as a JAVA execution environment.

The one or more stored value payment applets 210A-N may include respective attributes such as one or more applet identifiers, one or more attributes indicative of a stored monetary value associated with the respective stored value payment applets 210A-N, and/or one or more attributes indicative of one or more services associated with the respective stored value payment applets 210A-N.

In one or more implementations, one or more of the secure processor 302, the RAM 304, the security engine 306, the interface 308, the non-volatile memory 310, and/or one or more portions thereof, may be implemented in software (e.g., subroutines and code), may be implemented in hardware (e.g., an ASIC, an FPGA, a PLD, a controller, a state machine, gated logic, discrete hardware components, or any other suitable devices) and/or a combination of both.

Figure 4:
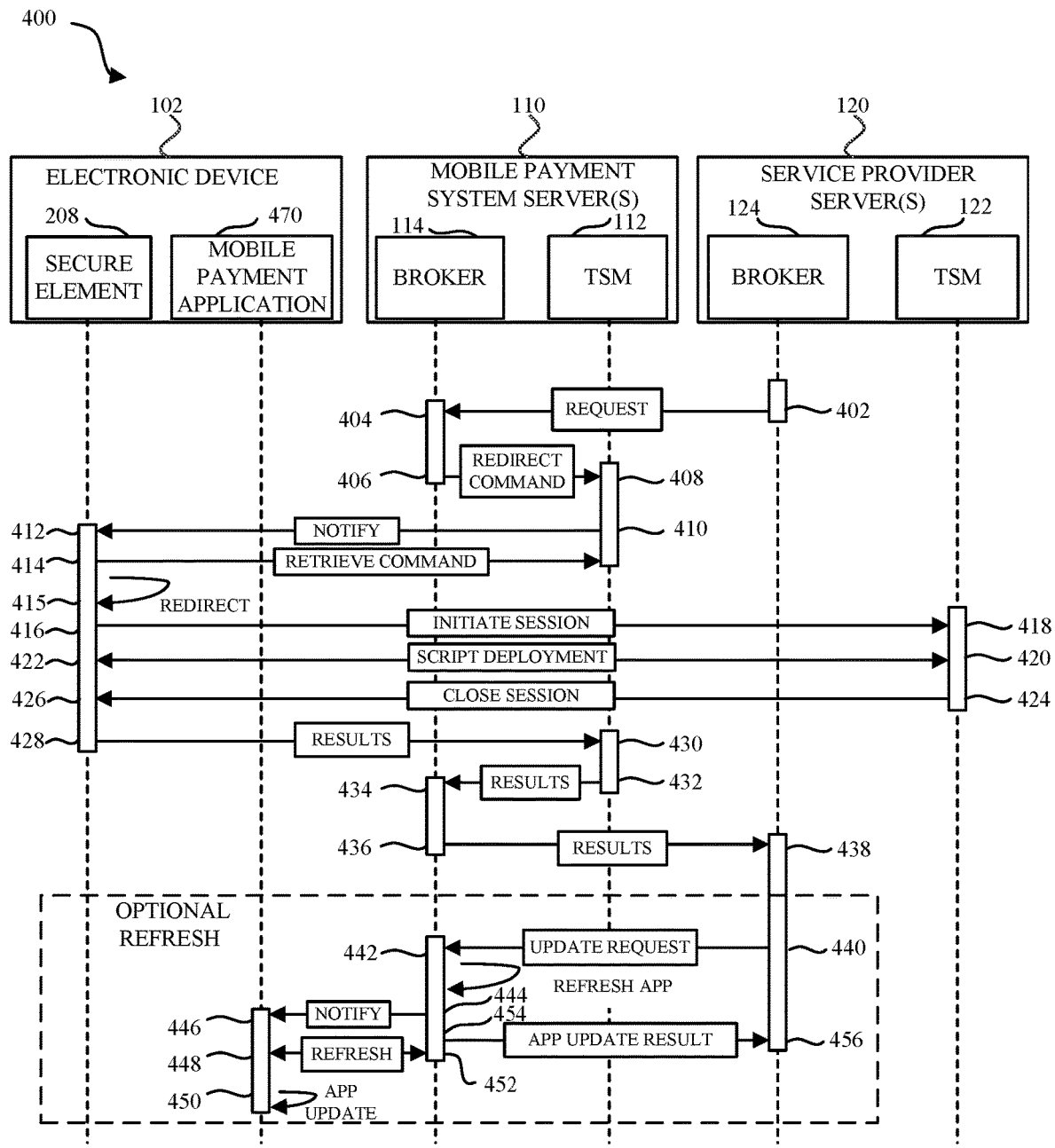
FIG. 4 illustrates an example process flow in a system for script deployment through service provider servers in accordance with one or more implementations.

FIG. 4 illustrates an example process flow 400 in a system for script deployment through service provider servers in accordance with one or more implementations. For explanatory purposes, the operations of the process flow 400 are described herein as occurring in serial, or linearly. However, multiple operations of the process flow 400 may occur in parallel. In addition, the operations of the process flow 400 need not be performed in the order shown and/or one or more operations of the process flow 400 need not be performed.

The process flow 400 may be initiated when, for example, the one or more service provider servers 120 for a given service provider receive a request to modify a credential, e.g., a transaction credential (associated with the service provider) that is provisioned as a stored value payment applet on the secure element 208 of the electronic device 102. The request may be received via any mechanism, including through a mobile application and/or web site associated with the service provider and/or via a physical machine associated with the service provider.

Upon receiving the request to modify a transaction credential, or upon otherwise determining that a transaction (e.g., modification, addition, and/or renewal) should be performed with respect to a transaction credential provisioned as a stored value payment applet on the secure element 208 of the electronic device 102, the broker server 124 of the one or more service provider servers 120 transmits a request to the broker server 114 of the one or more mobile payment system servers 110 requesting to perform the transaction directly with the secure element 208 of the electronic device 102 (402). The request may be transmitted using a secure sockets layer (SSL) link and/or other security mechanisms may be utilized by the broker server 124 to authenticate with the broker server 114.

The request may include a redirect request, such as a request to redirect a payload from the secure element 208 to the TSM server 122 of the one or more service provider servers 120. The request may further include a DPAN identifier corresponding to the transaction credential, a transaction identifier that may be, for example, a pseudorandom number or other unique identifier for identifying the transaction, and/or a network identifier (e.g., a uniform resource locator) for communicating with the TSM server 122 of the one or more service provider servers 120.

The broker server 114 of the one or more mobile payment system servers 110 receives the request (404) and verifies that the TSM server 122 of the one or more service provider servers 120 is authorized to perform the transaction directly with the secure element 208 of the electronic device 102. For example, the broker server 114 may identify, based at least in part on the DPAN identifier, the secure element 208 of the electronic device 102 on which the transaction credential is provisioned and the broker server 114 may verify that the TSM server 122 is authorized to communicate directly with the secure element 208 and/or is authorized to modify the transaction credential provisioned on the secure element 208.

Upon verifying that the TSM server 122 is authorized to perform the transaction, the broker server 114 transmits, to the TSM server 112 of the one or more mobile payment system servers 110, a redirect command to be provided to the secure element 208 of the electronic device 102 (406). The redirect command may include, for example, a redirect request or payload, a DPAN identifier corresponding to the transaction credential, the transaction identifier, and/or the network identifier for communicating with the TSM server 122. The TSM server 112 receives the redirect command (408) and notifies the secure element 208 of the electronic device that a command for the secure element 208 is awaiting retrieval at the TSM server 112 (410).

The secure element 208 of the electronic device 102 receives the notification, e.g. via the host processor 202 of the electronic device 102 (412), and retrieves the redirect command from the TSM server 112 (414). The secure element 208 performs the redirect command (415) to initiate a communication session with the TSM server 122 of the one or more service provider servers 120 in order to perform the transaction (416). The TSM server 122 receives the communication from the secure element 208 and initiates the communication session with the secure element 208 (418). In one or more implementations, the secure element 208 may initiate the communication session with the TSM server 122 using the network identifier included in the redirect command, and/or the secure element 208 may provide the TSM server 122 with information when initiating the communication session, such as the transaction identifier and/or one or more attributes of the transaction credential being modified.

The secure element 208 may also engage in one or more authentication and/or security protocols with the TSM server 122 when initiating the communication session. Upon successfully completing any such protocols, the TSM server 122 deploys one or more scripts to the secure element 208 of the electronic device 102 (420). The secure element 208 receives the one or more scripts deployed from the TSM server 122 (422), and executes the one or more scripts to cause the modification to the transaction credential provisioned on the secure element 208. In one or more implementations, the scripts may be executed by the secure element 208 in the order that they are received from the TSM server 122, and/or the scripts may be executed in any order. In one or more implementations, the script deployment transaction may involve continuous and/or intermittent authentication or other security protocols between the secure element 208 and the TSM server 122 over the course of the transaction. Moreover, although shown only as one script deployment exchange (420-422), the electronic device 102 and service provider servers 120 may conduct multiple exchanges to perform a transaction.

When the script deployment is completed, the TSM server 122 transmits a message to the secure element 208 indicating that the communication session can be closed (424). The secure element 208 receives the message (426) and closes the communication session. The secure element 208 transmits the results of the transaction to the TSM server 112 of the one or more mobile payment system servers 110 (428). The results may include, for example, the transaction identifier of the transaction and a status code indicating the result of the transaction, such as a hypertext transfer protocol (HTTP) status code. In one or more implementations, the results may be exclusive of any of the information modified on and/or added to transaction credential provisioned on the secure element 208, or the results may include any such information.

The TSM server 112 receives the results (430) and forwards, or posts, the results to the broker server 114 of the one or more mobile payment system servers 110 (432). The broker server 114 receives the results (434), and forwards, or posts, the results to the broker server 124 of the one or more service provider servers 120 (436). The broker server 124 receives the results (438) and determines, based at least in part on the results, whether a mobile payment application 470 operating on the electronic device 102 should be refreshed to reflect the results of the transaction. For example, a refresh of the mobile payment application 470 may be utilized to update the mobile payment application 470 to reflect a transaction result that includes one or more of: adding a new service, renewing an existing service, changing an existing service, adding stored monetary value, and the like. In one or more implementations, the refresh may not be necessary and/or utilized for a transaction of adding stored monetary value to a transaction credential provisioned on the secure element 208. The refresh of the mobile payment application 470 may include one or more of refreshing data being displayed by the mobile payment application 470, refreshing data locally cached by the mobile payment application 470 for display, such as from the secure element 208, and the like.

If the broker server 124 determines that the refresh of the mobile payment application 470 is desirable and/or necessary, the broker server 124 transmits an update request to the broker server 114 of the one or more mobile payment system servers 110 (440). The broker server 114 of the one or more mobile payment system servers 110 receives the update request (442) and notifies the mobile payment application 470, e.g., via the host processor 202 of the electronic device 102, of the requested refresh (444). The mobile payment application 470 receives the notification (446), refreshes its data with the most recent information from the secure element 208 (448), updates the displayed information (450), and informs the broker server 114 that the mobile payment application 470 has been updated (448).

The broker server 114 receives the notification that the mobile payment application 470 has been refreshed (452) and transmits an indication of the same to the broker server 124 of the one or more service provider servers 120 (454). The broker server 124 receives, from the broker server 114, the indication that the mobile payment application 470 has been refreshed (456) and completes any remaining business logic and/or logging with respect to the transaction.

Figure 5:
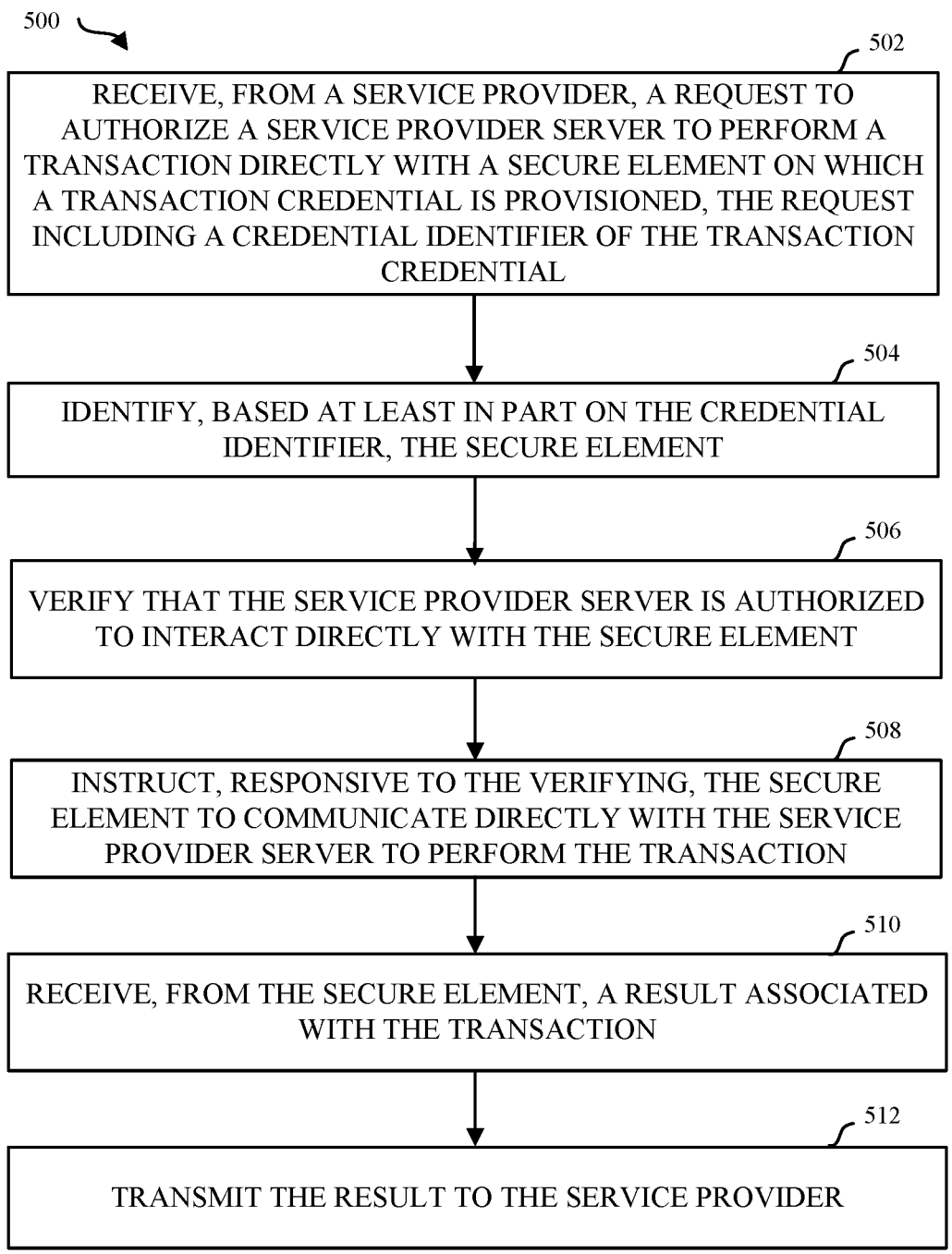
FIG. 5 illustrates a flow diagram of an example process for one or more mobile payment system servers in a system for script deployment through service provider servers in accordance with one or more implementations.

FIG. 5 illustrates a flow diagram of an example process 500 for one or more mobile payment system servers 110 in a system for script deployment through service provider servers in accordance with one or more implementations. For explanatory purposes, the process 500 is primarily described herein with reference to the one or more mobile payment system servers 110 of FIG. 1. However, the process 500 is not limited to the one or more mobile payment system servers 110 of FIG. 1, and one or more blocks (or operations) of the process 500 may be performed by one or more other components of the one or more mobile payment system servers 110. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed.

In the process 500, the one or more mobile payment system servers 110, such as the broker server 114, receives, from the one or more service provider servers 120, such as the broker server 124, a request to authorize one of the one or more service provider servers 120, such as the TSM server 122, to perform a transaction directly with the secure element 208 on which a transactional credential is provisioned, e.g., as a stored value payment applet (502). The request may include a credential identifier corresponding to the transaction credential, such as a DPAN identifier and/or an applet identifier, and/or the request may include a network identifier for communicating with the TSM server 122.

The one or more mobile payment system servers 110, such as the broker server 114, identifies, based at least in part on the credential identifier, the secure element 208 on which the transactional credential is provisioned (504). For example, the broker server 114 may store and/or may have access to mappings between credential identifiers, such as DPAN identifiers, and identifiers of the respective secure elements on which the corresponding transaction credentials are provisioned and/or identifiers of the respective electronic devices containing the respective secure elements. In one or more implementations, the broker server 114 may further store and/or have access to information, such as network identifiers, media access control (MAC) addresses, etc., for communicating with the respective secure elements, e.g., via the respective electronic devices.

The one or more mobile payment system servers 110, such as the broker server 114, verifies that the one or more service provider servers 120, such as the TSM server 122, are authorized to interact directly with the secure element 208 on the electronic device 102 (506). For example, one or more mobile payment system servers 110 may verify that the DPAN identifier corresponds to a transaction credential associated with the one or more service provider servers 120 and/or that the one or more service provider servers 120 are associated with appropriate privileges for communicating directly with the secure element 208. In one or more implementations, the verifying may be based at least in part on the one or more service provider servers 120, such as the broker server 124, authenticating with the one or more mobile payment system servers 110, such as the broker server 114.

In one or more implementations, the one or more mobile payment system servers 110 may verify that the one or more service provider servers 120, such as the TSM server 122, are located within a geographic proximity of the secure element 208 on the electronic device 102. For example, the one or more mobile payment system servers 110 may determine that the one or more service provider servers 120 are not authorized to perform the transaction directly with the secure element 208 when the one or more service provider servers 120, such as the TSM server 122, are determined to be more remote from the secure element 208 than the one or more mobile payment system servers 110, such as the TSM server 112.

The one or more mobile payment system servers 110, such as the TSM server 112, may instruct, responsive to the verifying, the secure element 208 to communicate directly with the one or more service provider servers 120, such as the TSM server 122, to perform the transaction (508). For example, the one or more mobile payment system servers 110 may transmit a command to the secure element 208 over the network 106 via the host processor 202 of the electronic device 102. In one or more implementations, the one or more mobile payment system servers 110 may provide the secure element 208 with a network identifier, such as a URL, for communicating directly with the one or more service provider servers 120, such as the TSM server 122.

After the secure element 208 has communicated with the one or more service provider servers 120 to perform or attempt to perform the transaction, as is discussed in more detail below with respect to FIGS. 6 and 7, the one or more mobile payment system servers 110, such as the TSM server 112, receive, from the secure element 208 a result associated with the performance of the transaction (510). The result may include the transaction identifier originally received by the one or more mobile payment system servers 110 from the one or more service provider servers 120 (502) as well as an outcome of the transaction. In one or more implementations, the outcome may be an HTTP status code, such as "200 OK," "400 Bad Request," or generally any HTTP status code. The one or more mobile payment system servers 110, such as the broker server 114, forward the result of the transaction to the one or more service provider servers 120, such as the broker server 124 (512).

Figure 6:
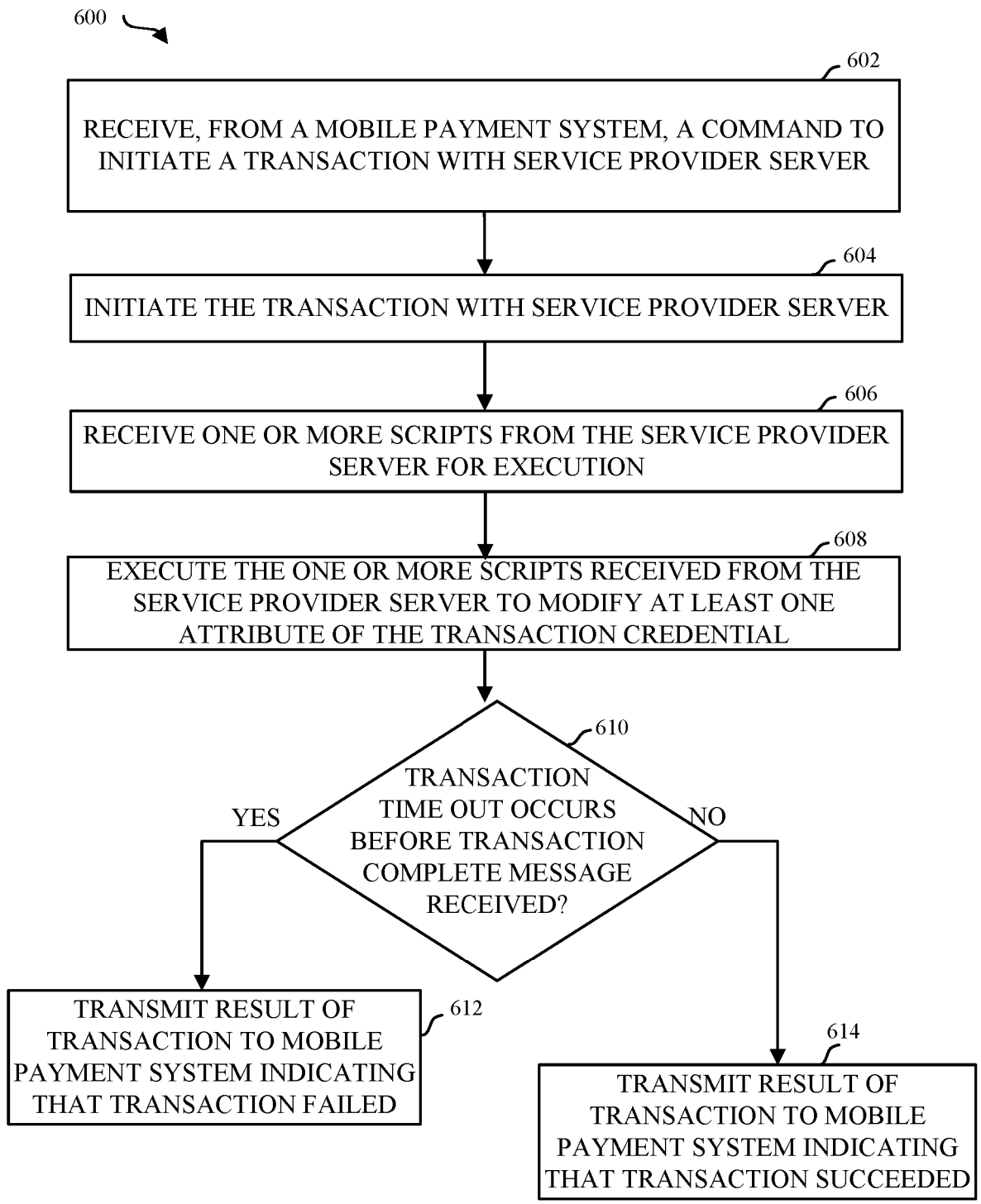
FIG. 6 illustrates a flow diagram of an example process for a secure element of an electronic device in a system for script deployment through service provider servers in accordance with one or more implementations.

FIG. 6 illustrates a flow diagram of an example process 600 for a secure element 208 of an electronic device 102 in a system for script deployment through service provider servers in accordance with one or more implementations. For explanatory purposes, the process 600 is primarily described herein with reference to the secure element 208 of the electronic device 102 of FIG. 2. However, the process 600 is not limited to the secure element 208 of the electronic device 102, and one or more blocks (or operations) of the process 600 may be performed by one or more other components of the electronic device 102 and/or the secure element 208. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed.

In the process 600, when the one or more service provider servers 120 have been authorized to perform a transaction directly with the secure element 208 of the electronic device 102, the secure element 208 receives, from the one or more mobile payment system servers 110, such as the TSM server 112, a command to initiate the transaction with the one or more service provider servers 120, such as the TSM server 122 (602). For example, the secure element 208 may receive, via the host processor 202 of the electronic device 102, a request to redirect a payload to the one or more service provider servers 120 to initiate the transaction. The request may include, for example, a DPAN identifier corresponding to a credential provisioned on the secure element 208, a network identifier for communicating with the one or more service provider servers 120, and/or a transaction identifier.

The secure element 208 initiates the transaction with the one or more service provider servers 120, such as the TSM server 122, by redirecting a payload to the one or more service provider servers 120 (604). Alternatively, the service provider servers 120 may initiate the transaction with the secure element 208, once approved to interface directly. The secure element 208 may also provide one or more secure element information items to the one or more service provider servers 120, such as information identifying the secure element 208, the DPAN identifier of the credential provisioned on the secure element 208, the transaction identifier, and/or generally any information that may facilitate initiating the transaction. The secure element 208 may also engage in one or more security and/or authentication protocols with the one or more service provider servers 120, such as the TSM server 122. The security and/or authentication protocols may involve one or more exchanges, such as security token exchanges, between the secure element 208 and the one or more service provider servers 120.

The secure element 208 receives one or more scripts from the one or more service provider servers 120 (606). The one or more scripts may, when executed by the secure element 208, cause a change to at least one attribute of a stored value payment applet provisioned on the secure element 208 that corresponds to the transaction credential. For example, the one or more scripts, when executed by the secure element 208, may cause a change, such as an increase, in a monetary value attribute of the stored value payment applet, may cause a change in a renewal and/or expiration data attribute of the stored value payment applet, and/or may cause change in one or more service attributes of the stored value payment applet, such as to add and/or modify one or more services. The secure element 208 may execute the one or more scripts (608) received from the one or more service provider servers 120 to cause the modification to the at least one attribute of the stored value payment applet corresponding to the transaction credential (608).

Since the transaction may involve one or more back and forth exchanges between the secure element 208 and the one or more service provider servers 120, the secure element 208 determines whether the transaction times out before a transaction complete message is received from the one or more service provider servers 120 (610). For example, the transaction may be associated with a session time-out and, if the time-out occurs before the transaction is completed, the transaction may be timed-out by the secure element 208, such as to account for network disruptions and/or other factors that may cause the transaction to fail.

If the transaction times out before the transaction complete message is received (610), the secure element 208 transmits a result of the transaction to the one or more mobile payment system servers 110, the result indicating that the transaction failed and the result including the transaction identifier (612). In one or more implementations, the result may further indicate the reason for the failure and/or may include other information regarding the transaction. In one or more implementations, the secure element 208 may rollback any portion of the transaction that was completed before the failure, such as by changing one or more attributes of the stored value payment applet to reflect their values prior to the start of the transaction. For example, the secure element 208 may receive one or more scripts from the one or more mobile payment system servers 110, such as the TSM server 112, to change one or more attributes of the stored value payment applet to reflect their values prior to the start of the transaction.

If the secure element 208 receives a transaction complete (or session complete) message from the one or more service provider servers 120 before the transaction time out occurs (610), the secure element 208 transmits a result of the transaction to the one or more mobile payment system servers 110, the result indicating that the transaction succeeded (assuming the scripts executed properly and no other errors occurred) and the result including the transaction identifier (614).

Figure 7:
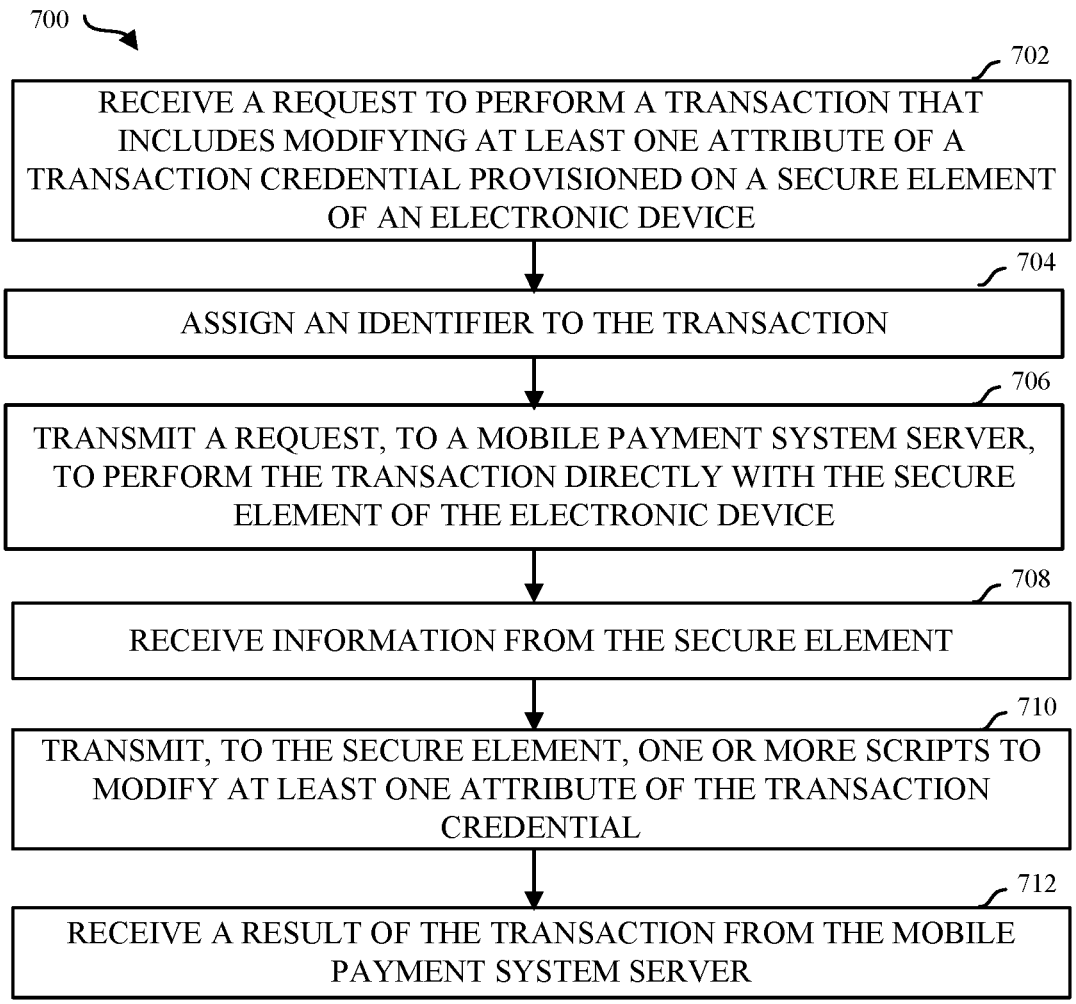
FIG. 7 illustrates a flow diagram of an example process for one or more service provider servers in a system for script deployment through service provider servers in accordance with one or more implementations.

FIG. 7 illustrates a flow diagram of an example process 700 for one or more service provider servers 120 in a system for script deployment through service provider servers in accordance with one or more implementations. For explanatory purposes, the process 700 is primarily described herein with reference to the one or more service provider servers 120 of FIG. 1. However, the process 700 is not limited to the one or more service provider servers 120 of FIG. 1, and one or more blocks (or operations) of the process 700 may be performed by one or more other components of the one or more service provider servers 120. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed.

In the process 700, the one or more service provider servers 120 receive a request to perform a transaction that includes a modification of at least one attribute of a transaction credential provisioned on a secure element 208 of an electronic device 102 (702). For example, the request may be received by the one or more service provider servers 120 through a mobile application and/or web site associated with the one or more service provider servers 120.

The one or more service provider servers 120 may assign an identifier to the transaction (704). The identifier may be, for example, a pseudorandom number or an identifier that can otherwise be used by the one or more service provider servers 120 to uniquely identify the transaction. The identifier may facilitate, for example, tracking the results of the transaction. The one or more service provider servers 120, such as the broker server 124, may transmit a request to the one or more mobile payment system servers 110, such as the broker server 114, to perform the transaction directly with the secure element 208 of the electronic device 102 (706). The request may include the identifier assigned to the transaction (704) as well as an identifier of the transaction credential associated with the transaction, such as the DPAN identifier of the transaction credential.

The one or more service provider servers 120, such as the TSM server 122, may receive information from the secure element 208 of the electronic device 102, such as one or more messages to initiate the transaction (708). The information may include: information identifying the secure element 208, information identifying the electronic device 102, the identifier assigned to the transaction, and/or any other information that may facilitate the transaction. The one or more service provider servers 120 may perform one or more security and/or authentication protocols with the secure element 208, which may involve one or more data exchanges with the secure element 208.

The one or more service provider servers 120, such as the TSM server 122, transmit one or more scripts to the secure element 208 to modify the at least one attribute of the transaction credential (710). When the transaction is completed, the one or more service provider servers 120, such as the TSM server 122, may transmit a transaction complete (or session complete) message to the secure element 208. The one or more service provider servers 120, such as the broker server 124 may receive a result of the transaction from the one or more mobile payment system servers 110, such as the broker server 114 (712). For example, the secure element 208 may transmit a result of the transaction to the one or more mobile payment system servers 110 and the one or more mobile payment system servers 110 may forward the result to the one or more service provider servers 120. The one or more service provider servers 120 may perform one or more operations based at least in part on the result of the transaction. For example, if the transaction failed, the one or more service provider servers 120 may attempt to perform the transaction again, e.g., by repeating (706)-(712).

Figure 8:
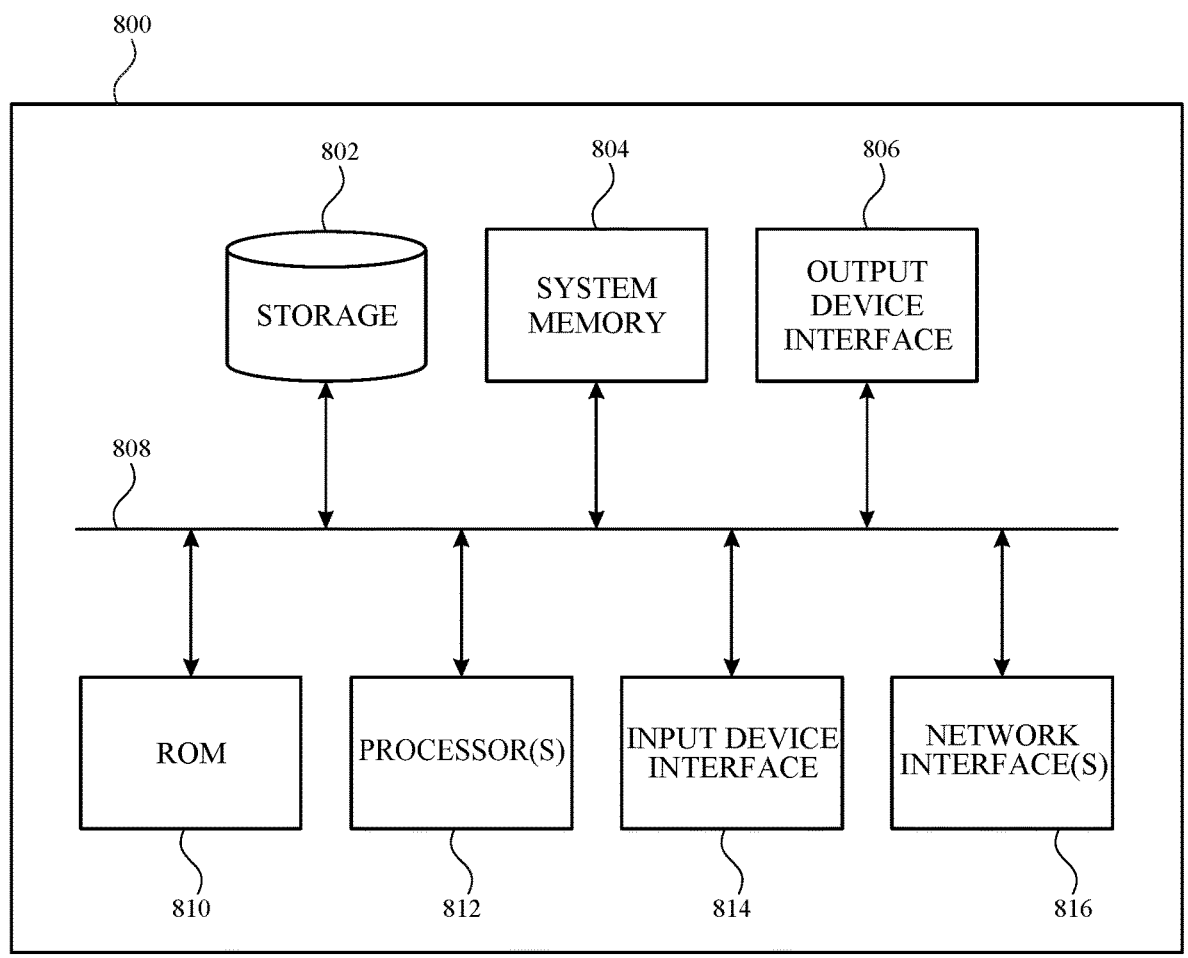
FIG. 8 conceptually illustrates an example electronic system with which aspects of the subject technology may be implemented in accordance with one or more implementations.

FIG. 8 conceptually illustrates an electronic system 800 with which one or more implementations of the subject technology may be implemented. The electronic system 800 can be, and/or can be a part of, the electronic device 102, and/or one or more of the servers 110, 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 102 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
  receiving, by a mobile payment system server and from a server of a service provider, a request to perform a transaction directly with a secure element of an electronic device on which a credential corresponding to the service provider is provisioned, wherein the request comprises a credential identifier corresponding to the credential;

identifying, by the mobile payment system server based at least in part on the credential identifier, the secure element of the electronic device;

verifying, by the mobile payment system server, that the service provider is authorized to interact directly with the secure element of the electronic device;

instructing, by the mobile payment system server and responsive to the verifying, the secure element of the electronic device to communicate directly with the server of the service provider to perform the transaction; and receiving, by the mobile payment system server and from the secure element of the electronic device, a result associated with the transaction.

2. The method of claim 1, further comprising:
receiving, from the service provider, a request to refresh a mobile payment application that provides information associated with the credential; and
causing the mobile payment application to be refreshed.

3. The method of claim 1, wherein receiving, from the service provider, the request to perform the transaction directly with the secure element of the electronic device further comprises:
receiving the request from a broker server associated with the service provider.

4. The method of claim 1, wherein instructing the secure element of the electronic device to communicate directly with the server of the service provider comprises providing the secure element of the electronic device with a network identifier for communicating directly with a trusted services manager server associated with the service provider.

5. The method of claim 1, wherein verifying that the service provider is authorized comprises verifying that the credential is provisioned on the secure element of the electronic device.

6. The method of claim 5, wherein, when the credential is verified as being provisioned on the secure element of the electronic device, the method further comprising verifying that the service provider is authorized to modify the credential.

7. The method of claim 1, further comprising:
transmitting the result to the service provider in association with a transaction identifier included in the request.

8. The method of claim 1, wherein the transaction comprises modifying at least one attribute of the credential.

9. The method of claim 8, wherein the result indicates whether the transaction succeeded without identifying the at least one attribute of the credential.

10. A device, comprising:
at least one processor configured to:
receive, from a mobile payment system server, a command to perform a transaction directly with a service provider server, the transaction being associated with a credential provisioned on the device by the mobile payment system server and the command comprising a network identifier for communicating with the service provider server;
communicate with the service provider server, based at least in part on the network identifier, to perform the transaction, the transaction comprising a modification of at least one attribute of the credential; and
provide a result of the transaction to the mobile payment system server.

11. The device of claim 10, where the at least one processor is further configured to:
receive one or more commands from the service provider server; and
execute the one or more commands to cause the modification of the at least one attribute of the credential.

12. The device of claim 11, wherein the at least one processor is further configured to:
perform one or more authentication protocols with the service provider server prior to receipt of the one or more commands from the service provider server.

13. The device of claim 10, wherein the at least one processor is further configured to:
receive, from the service provider server, a message indicating that the transaction has completed; and
responsive to receiving the message, provide the result of the transaction to the mobile payment system server, the result indicating that the transaction completed successfully.

14. The device of claim 10, wherein the at least one processor is further configured to:
determine that a time-out period has elapsed with respect to communicating with the service provider server; and
responsive to determining that the time-out period has elapsed, provide the result of the transaction to the mobile payment system server indicating that the transaction has failed.

15. The device of claim 10, wherein the modification to the at least one attribute of the credential comprises at least one of a modification to a stored monetary value associated with the credential, a renewal of a service associated with the credential, or a modification to the service associated with the credential.

16. A system, comprising:
a secure element comprising:
a memory configured to store a stored value payment applet corresponding to a credential, the stored value payment applet having been provisioned by a mobile payment system server on behalf of a service provider server; and
at least one secure processor configured to:
initiate a transaction with the service provider server responsive to receiving an instruction, from the mobile payment system server, to initiate the transaction;
receive, from the service provider server, one or more commands for causing a modification of at least one attribute of the stored value payment applet;
execute the one or more commands to cause the modification to the at least one attribute of the stored value payment applet; and
transmit a result of the transaction to the mobile payment system server.

17. The system of claim 16, further comprising:
at least one processor configured to:
execute a mobile payment application that displays information associated with the stored value payment applet stored in the memory of the secure element;
receive, from the mobile payment system server, a notification to refresh the mobile payment application to reflect the result of the transaction; and
cause a refresh of the mobile payment application.

18. The system of claim 17, wherein the at least one processor is communicatively coupled to the at least one secure processor, and the at least one secure processor is further configured to communicate with the mobile payment system server and the service provider server via the at least one processor.

19. The system of claim 17, wherein the at least one processor is further configured to:
   receive input comprising a request for the transaction to be performed; and
   transmit, to the service provider server, an indication of the input comprising the request for the transaction to be performed.

20. The system of claim 16, wherein the at least one secure processor is further configured to:
   receive, from the service provider server, an indication that the transaction is complete; and
   transmit the result of the transaction to the mobile payment system server responsive to receiving the indication, the result of the transaction indicating that the transaction completed successfully.

* * * * *